US012650196B2

(12) United States Patent (10) Patent No.: US 12,650,196 B2
Bai et al. (45) Date of Patent: Jun. 9, 2026

(54) POSITIONING AND INFORMATION TRANSMISSION METHOD OF HYDROLOGICAL MONITORING DEVICE IN SIGNAL-FREE AREA

(71) Applicant: Xi'an University of Technology, Xi'an (CN)

(72) Inventors: Tao Bai, Xi'an (CN); Dong Liu, Xi'an (CN); Linhui Mou, Xi'an (CN); Qianglong Feng, Xi'an (CN); Xinyue Liu, Xi'an (CN); Xin Li, Xi'an (CN); Erjuan Yang, Xi'an (CN)

( * ) Notice: Subject to any disclaimer, the term of this patent is extended or adjusted under 35 U.S.C. 154(b) by 293 days.

(21) Appl. No.: 18/399,749

(22) Filed: Dec. 29, 2023

(65) Prior Publication Data

US 2024/0410512 A1 Dec. 12, 2024

(30) Foreign Application Priority Data

Jun. 7, 2023 (CN) .......................... 202310668335.X

(51) Int. Cl.
*F16L 55/48* (2006.01)
*F16L 101/30* (2006.01)
*G01M 3/04* (2006.01)
(52) U.S. Cl.
CPC ............... *F16L 55/48* (2013.01); *G01M 3/04* (2013.01); *F16L 2101/30* (2013.01)
(58) Field of Classification Search
CPC .......... G01M 3/04; G01M 3/18; G01C 15/00; G01S 1/68; G01S 19/11; G01S 19/17;
G01S 19/46; G01S 5/0036; G01S 5/0236; G06Q 10/087; F16L 2101/30; F16L 55/48; Y02A 90/03; Y02A 90/30
See application file for complete search history.

(56) References Cited

U.S. PATENT DOCUMENTS

| | | | |
|---|---|---|---|
| 9,137,771 B2 * | 9/2015 | Wrappe | G01S 5/0036 |
| 9,749,844 B1 * | 8/2017 | Sovani | H04W 48/16 |
| 2017/0111872 A1 * | 4/2017 | Moon | H04W 4/80 |

FOREIGN PATENT DOCUMENTS

| | | | |
|---|---|---|---|
| CN | 116299723 A * | 6/2023 | G01V 3/12 |

* cited by examiner

*Primary Examiner* — Kristina M Deherrera
*Assistant Examiner* — Gedeon M Kidanu

(57) ABSTRACT

A positioning and information transmission method of a hydrological monitoring device in a single-free area combines a wireless communication technology with a hydrodynamics-based hydrological monitoring device, which can solve the problem of hydrological monitoring information transmission in a signal-free area such as a hydraulic tunnel. First, magnetic beacons each composed of an LoRa (long distance radio) terminal device and an ultra-wideband technology are arranged at the top of the interior of a signal-free tunnel at an interval of 500 m. When a hydrological monitoring device in use enters a coverage area of the magnetic beacon, the LoRa terminal device in the magnetic beacon will automatically start an internal communication protocol and receive data acquired by the device by monitoring, the data is transmitted based on a mutual LoRa communication protocol between the magnetic beacons, and finally, the data is transmitted to a ground central control system for storage.

3 Claims, 2 Drawing Sheets

POSITIONING AND INFORMATION TRANSMISSION METHOD OF HYDROLOGICAL MONITORING DEVICE IN SIGNAL-FREE AREA

CROSS REFERENCE TO THE RELATED APPLICATIONS

This application is based upon and claims priority to Chinese Patent Application No. 202310668335.X, filed on Jun. 7, 2023, the entire contents of which are incorporated herein by reference.

TECHNICAL FIELD

The present disclosure relates to the technical field of hydraulic and hydroelectric engineering, information communication, and positioning, and specifically, is a positioning and information transmission method of a hydrological monitoring device in a signal-free area.

BACKGROUND

The Qinling water conveyance tunnel has a total length of 98.3 km. It cannot be dynamically measured by a current device on the market due to the absence of signal. After water flows into the tunnel, a manual measurement ship cannot enter, so that data monitoring in the tunnel cannot be realized. Therefore, it is unable to monitor and respond in time to possible lining failure and leakage in the tunnel and leakage at a connection section. The Hanjiang-to-Weihe River diversion project is the largest and most far-reaching strategic, fundamental, and global water resource allocation project in Shaanxi Province. The project spans the two major river basins of the Yellow River and the Yangtze River, and crosses the Qinling Mountains, with an average annual water diversion volume of 1.5 billion $m^3$. Water is diverted from the Hanjiang River to water-receiving areas in the central Shaanxi plain, to meet the water demand of cities such as Xi'an and Xianyang, as well as 6 industrial parks along the line. This project benefits more than 14 million people and can supplement the agricultural water for 5 million mu (1 mu=666.67 square meters) of arable lands, and is a fundamental measure for alleviating the water shortage problem in cities and factories along the Weihe River in the central Shaanxi plain. The Hanjiang-to-Weihe River diversion project is composed of three parts, namely, the Huangjinxia and Sanhekou water control projects and the Qinling water conveyance tunnel.

The Qinling water conveyance tunnel of the Hanjiang-to-Weihe River diversion project has a total length of 98.3 km, of which the Huangsan section has a length of 16.52 km, and the Yueling section has a length of 81.63 km. It is an ultra-long tunnel. There are three control nodes. The first is the elevation of the outlet pool of the Huangjinxia pumping station at the starting point, the second is the control gate of the intermediate connection point, and the third is the elevation of the exit Huangchigou. In a case of satisfying the water diversion task, the elevation of the entrance or exit determines the slop and the cross-section size of the water conveyance tunnel. Therefore, the three important nodes may be taken as dangerous points for data monitoring. A large amount of real-time data is required for ensuring the normal function of the Qinling water conveyance tunnel. Currently, data monitoring cannot be realized when the Qinling water conveyance tunnel is in the water conveyance state.

At present, radar water level gauges, radar flow meters, acoustic doppler current profilers (ADCPs), electrical remote-controlled ships, unmanned aerial vehicles, and the like are applied to the Hanjiang-to-Weihe River diversion project for monitoring and measurement. The water level, velocity of flow, and quantity of flow are monitored in an online real-time manner at fixed points and fixed sections, and remote-controlled flow measuring ships and unmanned aerial vehicles equipped with monitoring instruments cruise and dynamically monitor the river sections of the project. All of the radar water level gauges, the radar flow meters, and the ADCPs have the limitations of measurement at fixed points and fixed sections. The electrical remote-controlled ships and the unmanned aerial vehicles are expensive, require surveyors to spend a lot of energy, and have high requirements for the professional degree of surveyors. Therefore, in view of the complex problems of no signal, fast velocity, large change in water level, many uncertain factors of a flow field, and the like in the water conveyance tunnel, the inventors have conducted a deep study and proposed the method of the present disclosure.

SUMMARY

The present disclosure takes the Qinling water conveyance tunnel of the Hanjiang-to-Weihe River diversion project as a study object, combines a hydrodynamics-based hydrological monitoring technology, an ultra-wideband (UWB) positioning technology, and an LoRa wireless communication technology to realize positioning and communication in a complex project without communication and positioning signals, so as to solve the hydrological data monitoring problem in the complex project.

In order to achieve the foregoing objective, the present disclosure adopts the following technical solution: a positioning and information transmission method of a hydrological monitoring device in a signal-free area, which includes the following specific steps:

step 1: acquiring, by a data acquisition device flowing down along the water flow in a signal-free area in a tunnel or river channel, information about the water level, water quality, and waves with the help of a sensor carried by the data acquisition device;

step 2: pre-processing the acquired data by using an improved algorithm model, denoising, filtering out valid data, and storing the valid data;

step 3: arranging, in the signal-free area, magnetic beacons based on a coverage area of a single magnetic beacon and complex topographical conditions of the signal-free area in the river channel or tunnel;

step 4: triggering, in a case that the monitoring device enters the coverage area of the magnetic beacon, a communication protocol between the monitoring device and the magnetic beacon, recording position information and time information of the monitoring device, and repeatedly performing step 4 in a case that the monitoring device enters the coverage area of the next magnetic beacon;

step 5: transmitting, based on a wireless communication protocol between the magnetic beacon and the monitoring device, position information and time information that are recorded by different magnetic beacons, and obtaining dynamic position information of the device based on the principle of time difference of arrival;

step 6: integrating, by a data processing module carried by the monitoring device, the time information, the position information, and the monitored information about the water level, water quality, and waves, packaging, and transmitting the information to the magnetic beacon; and step 7: dividing methods for connecting the magnetic beacons with a backend terminal into a wired transmission method and a wireless transmission method according to the actual situation, and transmitting the information transmitted by the monitoring device to the backend terminal, to realize precise positioning and information transmission of the monitoring device in the signal-free area.

Preferably, the magnetic beacons are arranged at the top of the interior of the signal-free tunnel at an interval of 500 m, the interval between the magnetic beacons is adjusted according to a specific environment, and high-precision three-dimensional position information of the monitoring device is obtained based on a nanosecond-level time domain pulse emitted by the magnetic beacon and a difference between times when the monitoring device arrives at adjacent magnetic beacons.

Preferably, during monitoring, a magnetic induction recognition apparatus of the monitoring device recognizes magnetic induction intensity generated by the magnetic beacon and generates an electromagnetic induction signal, and the electromagnetic induction signal is transmitted to the central control system by a signal transmission apparatus.

The present disclosure has the following beneficial effects:

The present disclosure solves the positioning and communication problems in a complex project without communication and positioning signals by combining a hydrodynamics-based hydrological monitoring technology, a UWB positioning technology, and an LoRa wireless communication technology, which provides technical support for waters that are difficult to inspect manually. Moreover, operation conditions of a project can be determined in time based on acquired data, to avoid improper use of water resources and occurrence of engineering accidents in time.

BRIEF DESCRIPTION OF THE DRAWINGS

In order to describe the structural composition of the present disclosure or the technical solution in the prior art more clearly, the following briefly introduces the accompanying drawings that are required to be used in the description of the structural composition or the prior art.

DETAILED DESCRIPTION OF THE EMBODIMENTS

Figure 1:
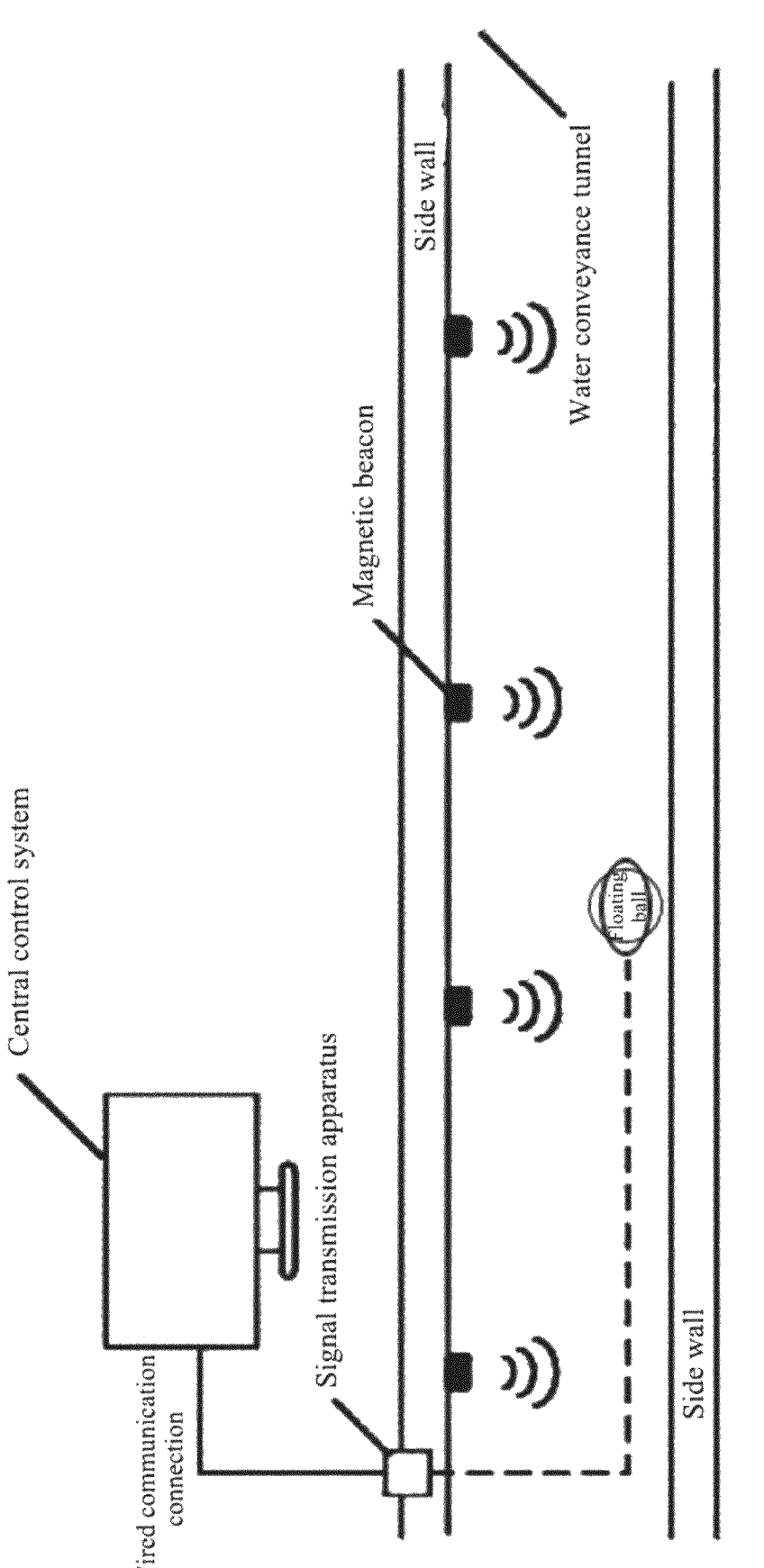
FIG. 1 is a schematic diagram of positioning and information transmission of a device in a signal-free area in a complex project according to the present disclosure.

The technical solution of the present disclosure will be clearly and completely described below with reference to the accompanying drawings.

Based on a UWB pulse technology, high-precision positioning of a monitoring device can be realized by directly modulating a shock pulse with very steep rise and fall times. Furthermore, based on changes in the position of a floating ball with the movement of the water flow, as well as a known interval between adjacent magnetic beacons, a velocity of the floating ball can be measured. The main technical points are provided below.

Time Difference of Arrival (TDOA): a time difference of radio signal propagation between a positioning tag and two different positioning base stations is determined by the UWB technology, and differences of distances between the positioning tag and four groups of positioning base station (it is assumed that a first group includes 1 # and 2 #, a second group includes 2 # and 3 #, a third group includes 3 # and 4 #, and a fourth group includes 4 # and 1 #) are obtained.

$$\begin{cases} d_{i,12} = r_{i,1} - r_{i,2} \\ d_{i,23} = r_{i,2} - r_{i,3} \\ d_{i,34} = r_{i,3} - r_{i,4} \\ d_{i,14} = r_{i,1} - r_{i,4} \end{cases} \tag{1}$$

In formula (1), $d_{i,12}$ to $d_{i,14}$ are differences of distances between a positioning card and four groups of positioning base stations that are determined by the UWB technology.

Three-dimensional coordinates of the positioning card can be calculated by using equation (2):

$$\begin{cases} d_{i,12} = \sqrt{(x_1 - x_i)^2 + (y_1 - y_i)^2 + (z_1 - z_i)^2} - \sqrt{(x_2 - x_i)^2 + (y_2 - y_i)^2 + (z_2 - z_i)^2} \\ d_{i,23} = \sqrt{(x_2 - x_i)^2 + (y_2 - y_i)^2 + (z_2 - z_i)^2} - \sqrt{(x_3 - x_i)^2 + (y_3 - y_i)^2 + (z_3 - z_i)^2} \\ d_{i,34} = \sqrt{(x_3 - x_i)^2 + (y_3 - y_i)^2 + (z_3 - z_i)^2} - \sqrt{(x_4 - x_i)^2 + (y_4 - y_i)^2 + (z_4 - z_i)^2} \\ d_{i,41} = \sqrt{(x_4 - x_i)^2 + (y_4 - y_i)^2 + (z_4 - z_i)^2} - \sqrt{(x_1 - x_i)^2 + (y_1 - y_i)^2 + (z_1 - z_i)^2} \end{cases} \tag{2}$$

Based on the TDOA technology, reciprocal communication between the positioning tag and the positioning base station is not required, only the positioning tag needs to transmit or receive a UWB signal, so higher-precision dynamic positioning and positioning capacity can be realized.

In a third aspect, based on an LoRa wireless communication technology, a long-distance information transmission technology for a signal-free area is provided, which mainly includes the following technical points:

LoRa is a low-energy, low-cost, and long-distance radio-frequency connection method. A magnetic beacon composed of an LoRa terminal device and the UWB technology can be used for data transmission in multiple ways. For example, each part of a communication apparatus may adopt hardware, software, firmware or a combination thereof to implement multiple technologies and solutions in a water conveyance tunnel, so as to avoid loss of monitored data. Moreover, during data transmission, the completely same data will be overwritten to minimize the use of storage space in a central control system. The multiple combinations of data transmission methods and overwriting of the completely same data can protect the cutting-edge technologies applied to the device from being copied by others to a certain extent. A comparison of mainstream wireless network technologies is shown in Table 1.

TABLE 1

| Comparison of mainstream wireless networking technologies | | | |
| --- | --- | --- | --- |
| Name | LoRa | NB-IOT | Zigbee |
| Network technology | Linear spread spectrum | Cellular | Based on Zigbee gateway |
| Network deployment | Independent networking | In-band deployment | Independent networking |
| Working frequency range | 1 GHz | 800/900 MHz | 2.4 GHz |
| Transmission distance/km | 20 | 15 | <1 |
| Transmission power | 20 | 20 | 10 |
| Typical capacity | 50 | 50 | <30 |
| Power consumption/ year | 10 | 10 | 2 |
| Cost/CNY | 30 | 60 | 6 |
| Applicable scene | Smart parking and pipe network monitoring | Centralized regional and field suburban projects | Applicable to sensors with small coverage ranges |

With the water conveyance tunnel of the Hanjiang-to-Weihe River inter-basin diversion project as an example, the present disclosure provides an automatic integrated device for full testing and monitoring in multiple waters such as water conservancy projects, ocean and offshore projects, and rivers and lakes. The device may be selectively equipped with a plurality of sensors, such as a flow velocity sensor, a wave sensor, and a water temperature sensor, according to actual use, and has good heat resistance and low temperature resistance and a wide range of application. Service restrictions of the device that are tested in a laboratory are shown in Table 2.

TABLE 2

| Service restrictions of the device | | |
| --- | --- | --- |
| Restricted conditions | Lower limit | Upper limit |
| Velocity of flow | 0.5 m/s | 50 m/s |
| Height of wave | 0 | 5 m |
| Depth of water | 0.5 m | — |
| Load | — | 3 kg |
| Service life | — | 3 months |
| Corrosion resistance | PH 4 | PH 10 |
| Temperature of water | −20° C. | 70° C. |

A D-Cell battery pack, an integrated circuit plate, a gyroscope, a signal receiver, and a signal indicator are equipped in the device of the present disclosure, and a plurality of sensors, such as a flow velocity sensor, a wave sensor, and a water temperature sensor, may be selectively equipped according to actual use. The device has the advantages of low cost, high adaptability, zero energy consumption in driving, co-operation of multiple devices, and the like. A comparison of the device and other similar products is shown in Table 3.

TABLE 3

| Comparison results of properties of products | | |
| --- | --- | --- |
| Device | Function | Range of application |
| LS1206B rotating flow meter | Measurement of velocity of flow | Open channel flow |
| Acoustic doppler current profiler (ADCP) | Measurement of velocity and quantity of | Places with wide space |

TABLE 3-continued

| Comparison results of properties of products | | |
| --- | --- | --- |
| Device | Function | Range of application |
| | flow | |
| Electromagnetic point flow meter | Measurement of velocity of flow | Applicable to open channels and underpasses |
| Ultrasonic water depth measuring instrument | Measurement of water depth | Mounted inside or outside large ships |
| LC-200 flow meter | Measurement of quantity of flow | Mounted in waters with signals |
| Water thermometer | Measurement of water temperature | Applicable to many environments |
| Underwater robot of Harbin Engineering University | Detection of tunnels | Tunnels |
| The device of the present disclosure | Velocity of flow, waves quality of water, and temperature water | Oceans, coasts, rivers, reservoirs, and tunnels |

The device can be used to realize simultaneous detection of a plurality of water conservancy elements, which improves the hydrological data acquisition efficiency. Furthermore, in experimental research, simultaneous measurement of elements of the same water body is more in line with the scientific detection method of control variables, and provides powerful, reliable, dynamic, and multi-element data support for mathematical model verification in water conservancy scientific research and teaching.

Figure 2:
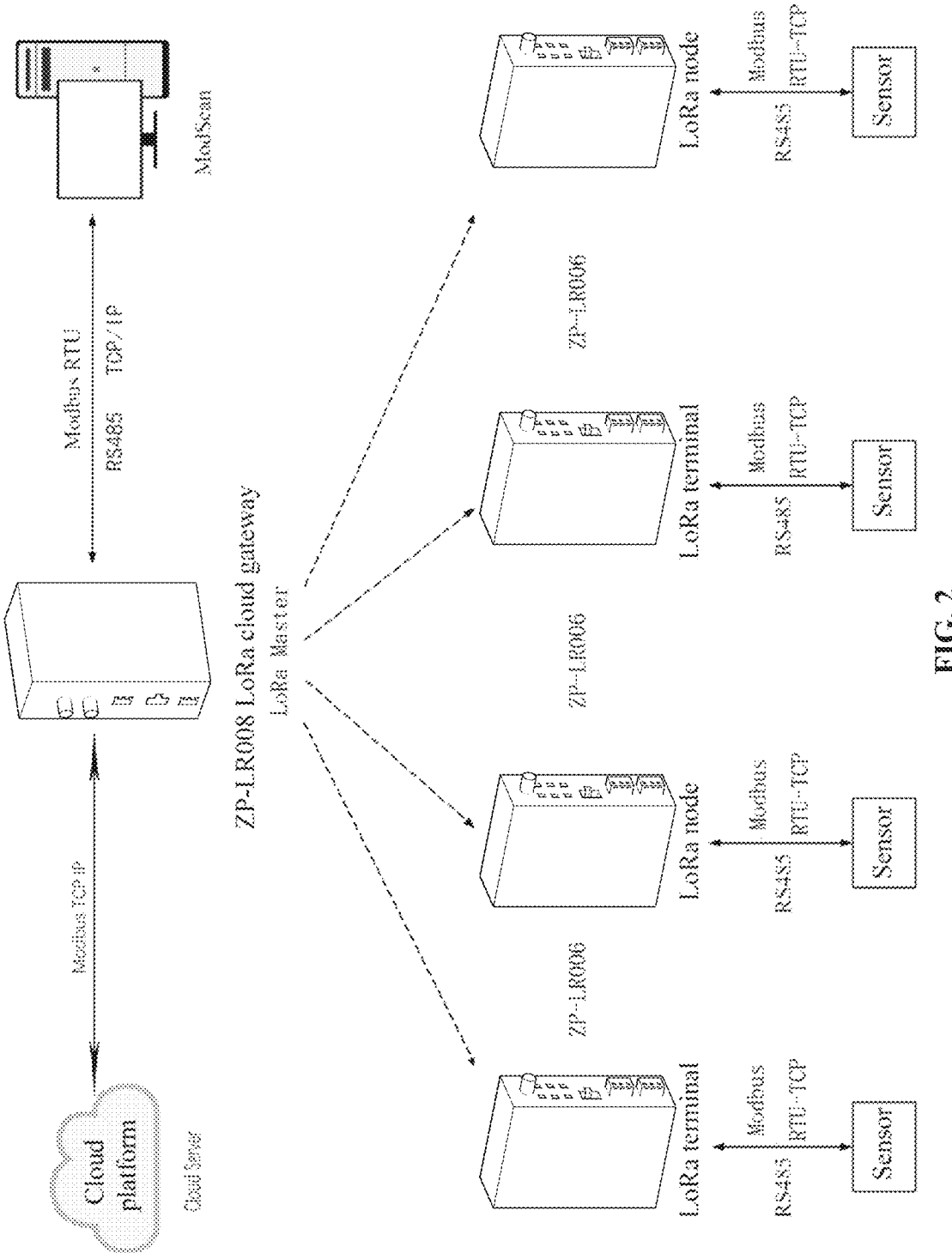
FIG. 2 is a schematic diagram of LoRa data transmission according to the present disclosure.

The present disclosure provides an information transmission and precise positioning technology for a signal-free area, and solves the positioning and communication problems in a complex project without communication and positioning signals based on the UWB positioning technology and the LoRa wireless communication technology. The core of the present disclosure is the combination of the UWB positioning technology, the LoRa wireless communication technology, and a hydrological monitoring device, which solves the positioning and communication problems in a complex project without communication and positioning signals, to realize hydrological data monitoring in the complex project and enlarge the range of application of a hydrological measurement device. As shown in FIG. 1 and FIG. 2, magnetic beacons are arranged at the top of the interior of a water conveyance tunnel at an interval of 500 m (the interval between the magnetic beacons is adjusted according to the complexity of a specific environment in the water conveyance tunnel), and when the hydrological monitoring device in use enters the coverage range of the magnetic beacon, position information of the device is calculated based on times when the device arrives at adjacent magnetic beacons, and recorded. In addition, an LoRa terminal device in the magnetic beacon will start an internal communication protocol, and receives data acquired by a floating ball by monitoring, the data is transmitted based on a mutual LoRa communication protocol between the magnetic beacons, and finally, the data is transmitted to a ground central control system for storage. In this way, communication signal transmission in a signal-free area is realized.

Finally, it should be noted that the above are only preferred embodiments of the present disclosure, and are not intended to limit the present disclosure. Although the present disclosure has been described in detail with reference to the foregoing embodiments, those skilled in the art can still modify the technical solutions described in the foregoing embodiments, or replace some technical features with equivalents. Any modification, equivalent substitution, improvement, and the like made within the spirit and principles of the present disclosure shall fall within the scope of protection of the present disclosure.

What is claimed is:

1. A positioning and information transmission method of a hydrological monitoring device in a signal-free area, comprising:

step 1: acquiring, by a data acquisition device flowing down along a water flow in a signal-free area in a tunnel or river channel, information about water level, water quality and waves through a sensor carried by the data acquisition device;

step 2: denoising the acquired information by using an algorithm model and filtering out data, and storing the data;

step 3: arranging, in the signal-free area, magnetic beacons based on a coverage area of a single magnetic beacons and physical features of the signal-free area in the river channel or tunnel affecting magnetic-beacon placement;

step 4: triggering, in a case that the hydrological monitoring device enters a coverage area of a magnetic beacon, a communication protocol between the hydrological monitoring device and the magnetic beacon, recording position information and time information of the hydrological monitoring device, and repeatedly performing step 4 in a case that the hydrological monitoring device enters a coverage area of a next magnetic beacon;

step 5: transmitting, based on a wireless communication protocol between the magnetic beacon and the hydrological monitoring device, position information and time information that are recorded by different magnetic beacons, and obtaining dynamic position information of the hydrological monitoring device based on a principle of time difference of arrival;

step 6: integrating, by a data processing module carried by the hydrological monitoring device, the time information, the position information, and the acquired information about the water level, the water quality and the waves to obtain an integrated information, packaging, and transmitting the integrated information to the magnetic beacon; and step 7: dividing methods for connecting the magnetic beacons with a backend terminal into a wired transmission method and a wireless transmission method, and transmitting the integrated information transmitted by the hydrological monitoring device to the backend terminal, to realize positioning and information transmission of the hydrological monitoring device in the signal-free area.

2. The positioning and information transmission method of the hydrological monitoring device in the signal-free area according to claim 1, wherein the magnetic beacons are arranged at a top of an interior of a signal-free tunnel at an interval of 500 m, the interval between the magnetic beacons is adjusted according to a specific environment, and three-dimensional position information of the hydrological monitoring device is obtained based on a nanosecond-level time domain pulse emitted by the magnetic beacons and a difference between times when the hydrological monitoring device arrives at adjacent magnetic beacons.

3. The positioning and information transmission method of the hydrological monitoring device in the signal-free area according to claim 1, wherein during monitoring, a magnetic induction recognition apparatus of the hydrological monitoring device recognizes magnetic induction intensity generated by the magnetic beacon and generates an electromagnetic induction signal, and the electromagnetic induction signal is transmitted to a central control system by a signal transmission apparatus.

* * * * *